(No Model.)
F. W. DOWNHAM & B. M. BLAUVELT.
LIQUID MEASURE.
No. 463,496. Patented Nov. 17, 1891.
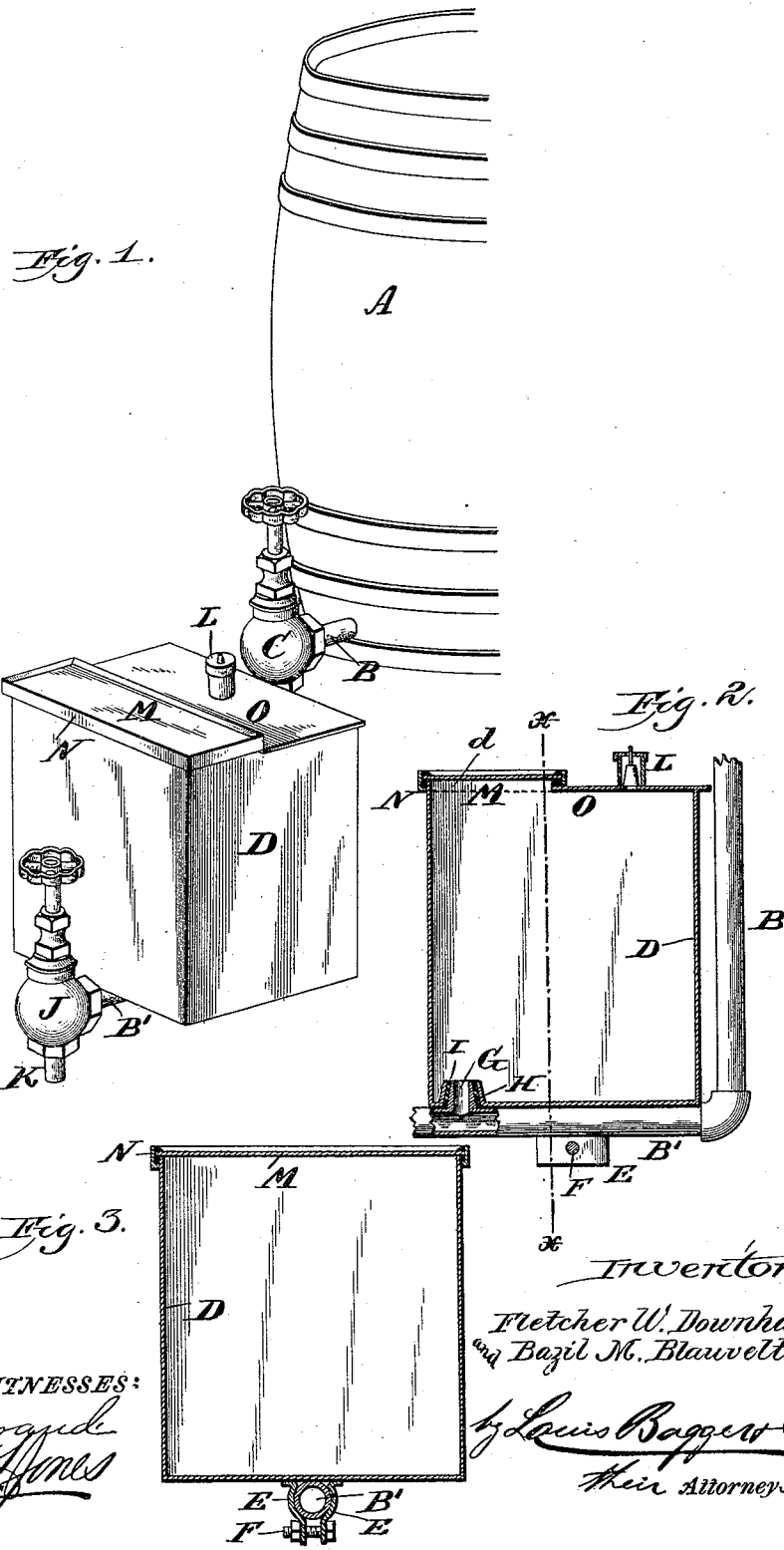

UNITED STATES PATENT OFFICE.

FLETCHER W. DOWNHAM AND BAZIL M. BLAUVELT, OF DESHLER, OHIO.

LIQUID-MEASURE.

SPECIFICATION forming part of Letters Patent No. 463,496, dated November 17, 1891.

Application filed May 16, 1891. Serial No. 393,030. (No model.)

*To all whom it may concern:*

Be it known that we, FLETCHER W. DOWNHAM and BAZIL M. BLAUVELT, both residents of Deshler, in the county of Henry and State of Ohio, have invented certain new and useful Improvements in Liquid-Measures; and we do hereby declare that the following is a full, clear, and exact description of the invention, which it appertains to make and use the same, reference being had to the accompanying drawings, which form a part of this specification, and in which—

Figure 1 is a perspective view of our device for measuring liquids. Fig. 2 is a sectional view of the measure on a vertical plane through the middle, and Fig. 3 is a vertical transverse sectional view on line $x$ $x$ in Fig. 2.

Like letters of reference denote corresponding parts in all the figures.

This invention relates to devices for measuring liquids or semi-liquids, such as beer, spirits, oil, molasses, &c.; and it consists in the specific construction of a device of that type which will be hereinafter more fully described, and specifically pointed out in the claim.

Reference being had to the accompanying drawings, the letter A designates the tank or barrel from which the liquid is to be drawn through the pipe B, which is provided with a valve C of suitable construction. Pipe B is bent at right angles below the valve, as shown at B', so as to form a rest or support for the measure D. The latter, preferably made of metal and tinned or glazed on the inside, is fastened upon pipe B' by a clip E and screw F, so that it may be readily removed and another (of different capacity) substituted when desired. Pipe B' has an upwardly-projecting nozzle G, fitting into a flanged aperture H in the bottom of the measure, said aperture being provided with a rubber gasket or packing-ring I to make a tight joint with the nozzle G. Pipe B' is continued beyond this nozzle to the outlet-valve J and discharge-spout K, beneath which the bottle or vessel to be filled is placed.

The flat top O of the measure D is provided with an air valve or vent L, and also with a pane of glass or other transparent material M. The latter is set in a frame N, which is raised slightly above the top of the measure, so that when this is full of liquid its contents will not touch or come in contact with the under side of the glass. In this manner the glass window will always be kept transparent and clean on its under side, the air-cushion formed by the space $d$ between the under side of the glass and the level of the flat top of the measure preventing the liquid from rising above the level of the top, as indicated by dotted lines on Fig. 2.

From the foregoing description, taken in connection with the drawings, the operation of this device will be readily understood. A measure of the proper capacity having been fastened upon pipe B', valve J is closed and valve C opened, when the contents of the tank or barrel will flow into the measure, the air contained therein escaping through the air-valve L. When the measure is full, valve C is closed, while the outlet-valve J is opened, and the contents of the measure are drawn off through the spout K into any desired receptacle. This operation is repeated as often as desired, the inside of the measure being inspected through the horizontal window or glass pane M, which, as we have seen, cannot come in actual contact with the liquid contained in the measure, even when this is filled to its fullest capacity, on account of the air-cushion $d$.

Having thus described our invention, we claim and desire to secure by Letters Patent of the United States—

The combination, with the discharge-pipe B, bent at right angles at B' and K and provided with the valves C and J and nozzle G, of the measure D, having air-valve L and glass pane M set above the flat top so as to form an air-chamber $d$, substantially as and for the purpose shown and set forth.

In testimony that we claim the foregoing as our own we have hereunto affixed our signatures in presence of two witnesses.

FLETCHER W. DOWNHAM.
BAZIL M. BLAUVELT.

Witnesses:
J. L. WARD,
BUTLER LYLE.